(12) United States Patent
Geaghan (10) Patent No.: US 7,724,243 B2
(45) Date of Patent: May 25, 2010

(54) TOUCH SENSORS INCORPORATING CAPACITIVELY COUPLED ELECTRODES

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 922 days.

(21) Appl. No.: 11/290,014

(22) Filed: Nov. 30, 2005

(65) Prior Publication Data

US 2006/0132462 A1 Jun. 22, 2006

Related U.S. Application Data

(60) Provisional application No. 60/638,463, filed on Dec. 22, 2004.

(51) Int. Cl.
*G06F 3/41* (2006.01)

(52) U.S. Cl. .................................. 345/173; 345/178

(58) Field of Classification Search .................. 345/100, 345/104, 156, 173–179; 178/18.01–18.06; 200/600; 361/280; 324/786
See application file for complete search history.

(56) References Cited

U.S. PATENT DOCUMENTS

| | | | |
|---|---|---|---|
| 4,293,734 A | 10/1981 | Pepper, Jr. | |
| 4,353,552 A | 10/1982 | Pepper, Jr. | |
| 4,371,746 A | 2/1983 | Pepper, Jr. | |
| 4,622,437 A | 11/1986 | Bloom et al. | |
| 4,731,508 A | 3/1988 | Gibson et al. | |
| 4,731,694 A * | 3/1988 | Grabner et al. | 361/280 |
| 4,797,514 A | 1/1989 | Talmage, Jr. et al. | |
| 5,045,644 A | 9/1991 | Dunthorn | |
| 5,194,862 A * | 3/1993 | Edwards | 341/20 |
| 5,369,228 A | 11/1994 | Faust et al. | |
| 5,386,219 A | 1/1995 | Greanias et al. | |
| 5,594,222 A * | 1/1997 | Caldwell | 200/600 |
| 5,869,790 A * | 2/1999 | Shigetaka et al. | 178/18.03 |
| 5,886,687 A | 3/1999 | Gibson | |
| 6,163,313 A * | 12/2000 | Aroyan et al. | 345/173 |
| 6,239,788 B1 | 5/2001 | Nohno et al. | |
| 6,488,981 B1 | 12/2002 | Richter et al. | |
| 6,549,193 B1 | 4/2003 | Huang et al. | |
| 6,568,285 B1 * | 5/2003 | Moore et al. | 73/862.55 |
| 6,593,916 B1 | 7/2003 | Aroyan | |
| 6,819,316 B2 * | 11/2004 | Schulz et al. | 345/174 |
| 7,148,704 B2 * | 12/2006 | Philipp | 324/686 |
| 7,307,626 B2 * | 12/2007 | Martchovsky | 345/174 |
| 2002/0149572 A1 * | 10/2002 | Schulz et al. | 345/174 |
| 2002/0197455 A1 | 12/2002 | Richter et al. | |
| 2004/0104826 A1 * | 6/2004 | Philipp | 341/34 |
| 2005/0076824 A1 * | 4/2005 | Cross et al. | 116/205 |
| 2005/0162408 A1 * | 7/2005 | Martchovsky | 345/173 |
| 2006/0207806 A1 * | 9/2006 | Philipp | 178/18.05 |
| 2008/0246735 A1 * | 10/2008 | Reynolds et al. | 345/173 |

* cited by examiner

*Primary Examiner*—Prabodh M Dharia
(74) *Attorney, Agent, or Firm*—Steven A. Bern (57) ABSTRACT

The present invention provides touch sensors that incorporate electrodes that are capacitively coupled through a dielectric layer to one or more resistive touch sensing layers, for example for linearizing the electric field across the resistive layer of an analog capacitive touch screen or for addressing the conductive elements of a matrix type capacitive touch screen. Such a construction allows for new manufacturing methods and new ways of constructing touch sensors.

6 Claims, 6 Drawing Sheets

TOUCH SENSORS INCORPORATING CAPACITIVELY COUPLED ELECTRODES

CROSS REFERENCE TO RELATED APPLICATION

This application claims the benefit of U.S. Provisional Patent Application No. 60/638,463, filed Dec. 22, 2004.

The present invention provides touch sensors that include electrodes that are capacitively coupled to a resistive layer configured for sensing touch inputs.

BACKGROUND

Touch panels can provide a convenient and intuitive user interface for many electronic devices including personal digital assistants, tablet computers, public information kiosks, point of sale machines, gaming and entertainment devices, and the like. In many systems, connecting the touch sensitive elements to controller electronics and integrating the touch panel into the system can pose challenges.

SUMMARY

The present invention provides a touch sensor that includes a resistive layer configured for sensing a touch to the touch sensor, a resistor and electrode strip that has a plurality of electrodes mutually electrically connected by a resistor material, the resistor and electrode strip disposed on the touch sensor so that the electrodes are capacitively coupled to the resistive layer through a dielectric layer, the electrodes positioned to provide a uniformly distributed driving signal to the resistive layer.

The present invention also provides a method for making a touch sensorm the method including the steps of: providing an article including a resistive layer suitable for sensing a touch; providing a resistor and electrode strip that includes a plurality of electrodes mutually electrically connected by a resistor material; capacitively coupling the electrodes of the resistor and electrode strip to the resistive layer through a dielectric layer, the electrodes being positioned to provide a uniformly distributed driving signal to the resistive layer; and electrically coupling the resistor and electrode strip to controller electronics configured to communicate signals to and from the resistive layer through the resistor and electrode strip.

In another aspect, the present invention provides a touch sensor that includes a plurality of electrically isolated resistive elements configured for sensing a touch to the touch sensor and an electrode strip having a plurality of electrodes individually electrically connected to controller electronics, the electrode strip disposed so that each of the electrodes is capacitively coupled to one of the resistive elements through a dielectric layer.

The present invention further provides a method of making a touch sensor that includes the steps of: providing a functioning display system that incorporates a functional element comprising a dielectric layer disposed over a resistive layer, the functional element disposed between a display and a viewing position; affixing a plurality of electrodes to the dielectric layer so that the electrodes are capacitively coupled to the resistive layer through the dielectric layer; and connecting the electrodes to controller electronics for providing a driving signal to the resistive layer and for sensing signals carried by the resistive layer due to a touch to the functional element.

BRIEF DESCRIPTION OF THE DRAWING

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail.

DETAILED DESCRIPTION

The present invention provides electrodes that are capacitively coupled to the touch sensitive element of a touch screen. The electrodes can provide linearization for an analog touch screen or connections to the sensing bars of a matrix touch screen.

Capacitive coupling of electrodes according to the present invention can be accomplished using either analog or matrix touch screens. One advantage of capacitively coupling electrodes as described in the present invention is that capacitively coupling electrodes through a dielectric layer disposed on the touch-sensing resistive layer can allow a different manufacturing sequence that includes placing a dielectric overcoat on resistive layer(s) before applying the electrodes. This may have particular advantages in systems where the dielectric material is or can be applied at the same time or in the same location as the resistive coat, for example in the same sputtering chamber, with the electrodes applied in a later step. As such, the present invention may be particularly suited to systems where it is desirable that the touch sensor substrate not be subjected to conditions such as the relatively high firing temperatures used for burning conductive frit through a dielectric layer, and so forth, for example when the substrate is a polymer film. The present invention may also be particularly suited to high volume manufacturing of the touch sensor whereby all the functional coatings can be processed in a roll-to-roll fashion while part-specific steps such as sizing, cutting, and applying electrodes can be performed later. The present invention may also be amenable to systems where the resistive coat and dielectric are applied or otherwise provided on a display substrate, for example as the outer layers of a cathode ray tube (CRT) or liquid crystal display (LCD). In these situations, it may be an advantage to be able to apply and capacitively couple the electrodes after the display having the resistive and dielectric coatings is formed.

The present invention also provides for a new way of supplying touch sensitive devices. For example, coated substrates could be provided to a customer that include at least a dielectric layer disposed over a resistive layer. The coated substrates may provide a functionality other than touch input capability such as antireflection properties. The coated substrates provided can be configured so that at some later time, electrodes can be applied to and capacitively coupled through the dielectric layer to make the coated substrate into a functional touch sensor device. As such, optical enhancement films, light control films, or other such articles can be supplied that are configured for optionally converting into a touch sensor should a customer, distributor, original equipment manufacturer, or the like wish to do so.

In various embodiments, the present invention provides, for example, capacitively coupled electrodes for a touch sensor, capacitively coupled electrodes that do not reduce the linearity of an analog touch sensor, capacitively coupled electrodes that enhance the linearity of an analog touch sensor, capacitively coupled electrodes in electrical communication with a touch-sensing resistive layer through non-conductive hardcoat or protective layers, and capacitively coupled electrodes in electrical communication with a touch-sensing resistive layer through non-conductive optically functional layers. In various embodiments, the present invention provides an electrode and resistive strip component that, when applied to a touch sensor, can linearize the resistive layer of an analog touch sensor and connect signals into the resistive layer, for example through one or more dielectric layer. In various embodiments, the present invention allows touch panel assembly whereby electrodes are applied to the touch sensors after protective layers and/or optical layers are applied to the touch-sensing resistive layer on the touch sensor substrate.

In various embodiments, the present invention also provides, for example, capacitively coupled electrodes for a matrix of touch-sensing resistive bars, capacitively coupled electrodes in electrical communication with touch-sensing resistive bars through non-conductive hardcoat or protective layers, and capacitively coupled electrodes in electrical communication with touch-sensing bars through non-conductive optically functional layers. In various embodiments, the present invention provides electrodes that, when applied to a touch sensor, can connect signals into resistive bars, for example through one or more dielectric layers.

In various embodiments, the present invention allows touch panel assembly whereby electrodes are applied to the touch sensors after protective layers and/or optical layers are applied to the touch-sensing resistive bars on the touch sensor substrate(s). In various embodiments, the present invention provides a new touch screen assembly method whereby resistive and optical coated substrates may be manufactured as a separate component from touch screen electrodes, linearization, and interconnect components. This can allow a new marketing and distribution method whereby resistive and optical coated substrates may be sold as a separate component from touch screen electrodes interconnects.

In exemplary embodiments, new analog capacitive touch sensor constructions of the present invention include capacitively coupling multiple electrodes along each edge rather than through a single electrode. The multiple capacitively coupled electrodes along an edge can be mutually interconnected through one or more resistors so that the combination can be used to linearize the touch sensor without causing electric field distortions in the resistive layer that can be caused by shorting the signals at the edges. The present invention also provides electrode interconnect resistors made from a strip of resistive material, and attaching capacitively coupled electrodes continuously around the periphery of the touch panel rather than using four discrete electrodes, one at each of the edges. This can allow for driving the touch screen signals from the corners rather than from the edges.

Figure 1:
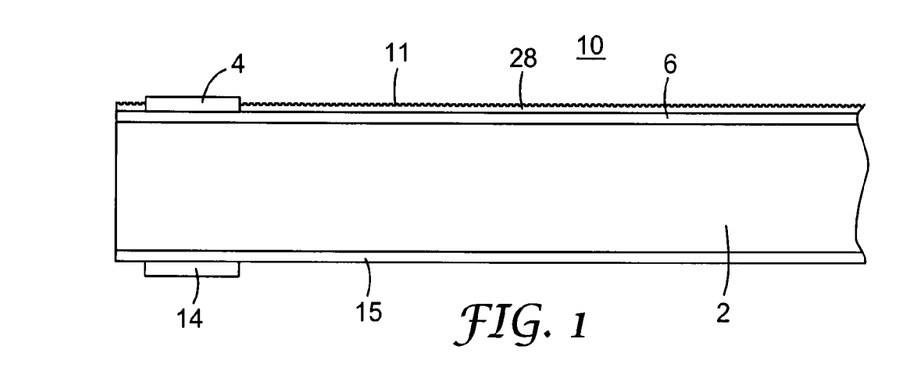
FIG. 1 is a cross sectional view of a portion of an analog touch screen.

FIG. 1 is a cross sectional view of a portion of an analog touch screen 10. The construction shown is typical of capacitive touch screens, though it may be used as a component of other types of touch screens, for example as the bottom substrate of a five-wire resistive touch screen. Substrate 2 is typically glass having a resistive coating 6 for sensing touches on the touch surface. Coating 6 may be covered with a dielectric coating 28 for improved durability, scratch resistance, antireflection, antiglare, or other purposes. As shown, dielectric coating 28 has a matte touch surface 11 for antiglare properties. In like touch screens known in the art, rows of electrodes 4 make electrical contact directly to coating 6 around its periphery. Touch screens may also have a rear shield of resistive or conductive coating 15 connected to a rear electrode 14. Coatings 6 and 14 are typically transparent coatings of indium tin oxide (ITO) or tin antimony oxide (TAO). Electrodes 4 and 14 are commonly composed of either sintered frit or conductive ink. It is also possible to "burn" electrodes through dielectric 28 to thereby make electrical connection to the resistive layer 6 by applying and sintering a frit after dielectric coating 28 is applied, as disclosed in U.S. Pat. No. 6,488,981, which is incorporated by reference. Electrodes 4 and 14 can be connected to an electronic controller (not shown) for applying an electric field across the resistive layer 6, for applying a guard signal on shield layer 15, and for measuring signals, generally electrical current flowing through each of the four corners of resistive layer 6, that are indicative of touch inputs to thereby determine touch position. Detecting touch inputs through capacitive coupling of a touch to the surface of a touch screen is discussed in U.S. Pat. Nos. 4,293,734; 4,353,552; 5,886,687; and 6,239,788, each of which are incorporated by reference into this document.

Figure 2:
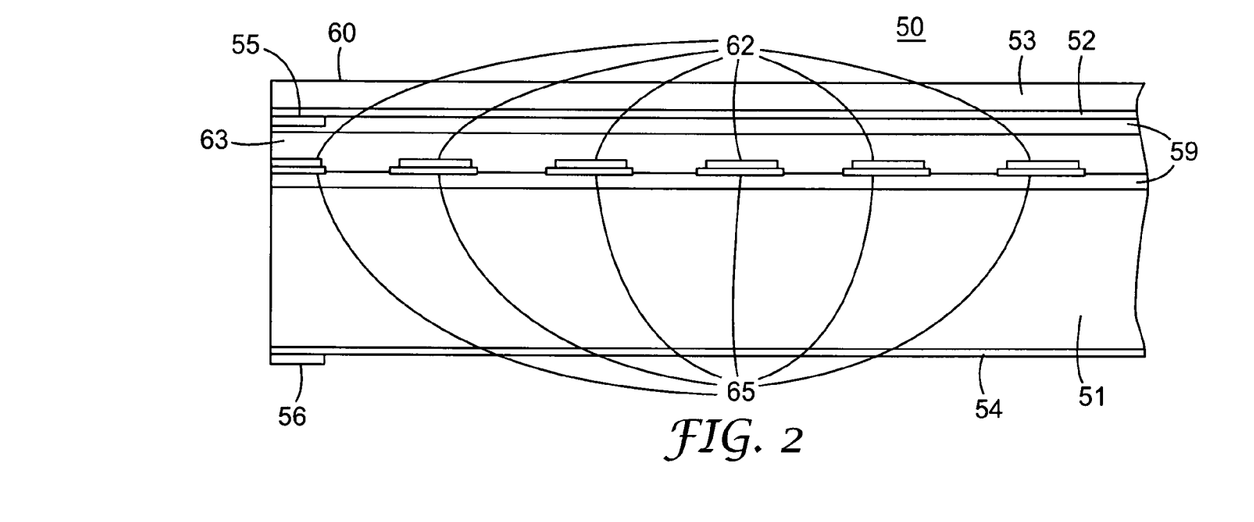
FIG. 2 is a cross sectional view of a portion of a matrix touch screen.

FIG. 2 shows a cross sectional view of a portion of a matrix touch panel 50 such as the one described in U.S. Pat. No. 5,386,219, which is incorporated by reference. Substrate 51 (typically glass) has one or more layers 53 and 63, usually made of polyester (PET), laminated with adhesive layers 59. PET layers 53 and 63 are coated with transparent resistive coatings 52 and 62, respectively. In the case shown, coatings 52 and 62 are patterned into bars, or traces, the bars in each respective layer oriented in a mutually orthogonal manner. Electrodes 65 make electrical contact directly to resistive traces 62, and electrodes 55 make electrical contact directly to resistive traces 52. There may also be a rear shield of resistive or conductive coating 54 connected to a rear electrode 56. Coatings 52, 62 and 54 are generally transparent coatings of ITO. The coatings 52 and 62 can alternatively be made from very fine wire. Electrodes 55, 56 and 65 are commonly composed of either sintered frit or conductive ink. Electrodes 55, 56 and 65 can be connected to controller electronics (not shown) for determining information related to the touch, including touch position and sometimes touch proximity.

According to the present invention, electrodes can be capacitively coupled to the touch-sensing elements of analog and matrix touch screens otherwise having constructions similar to those shown in FIGS. 1 and 2.

Figure 3:
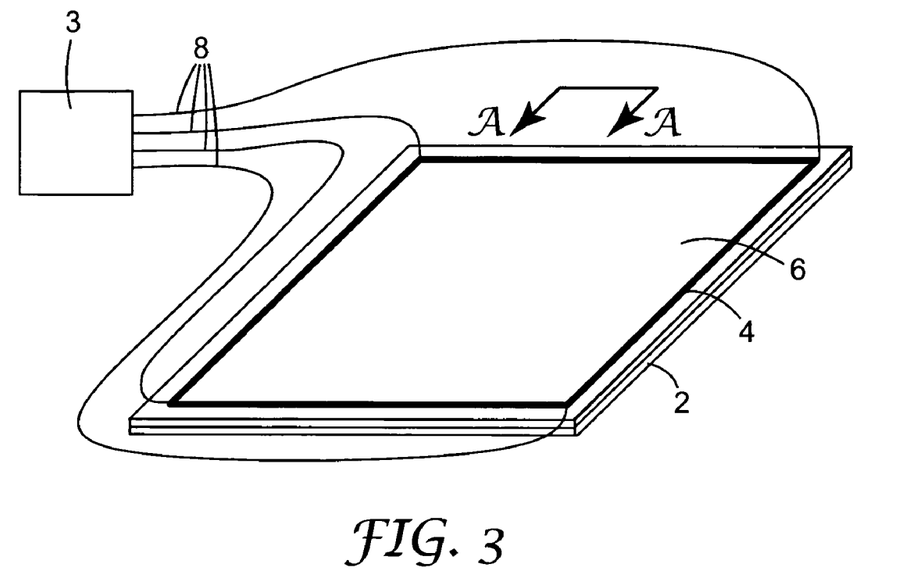
FIG. 3 is one embodiment of an analog touch sensor according to the present invention.

FIG. 3 shows an embodiment of an analog touch sensor 1 according to the present invention. The touch sensor includes a substrate 2 that has a resistive layer 6 disposed on its top surface. The resistive layer can be used to detect a touch, for example by coupling to a conductive touch object contacting the sensor and measuring the current flowing through predetermined points on the resistive layer, typically located in the corners. The resistive layer can be made of any suitable material that can be formed in a layer on a sensor substrate to give desirable electrical properties, and optionally optical properties. Exemplary sheet resistances can be about 100 ohms per square or greater, more typically between about 200 ohms per square and 10,000 ohms per square, with capacitive touch screens generally utilizing sheet resistances that are higher than those utilized by resistive touch screens. In applications where it is desirable to view a display through the touch sensor, transparent conductive materials can be used for the resistive layer, for example ITO, TAO, other doped tin oxides, conductive polymers, and so forth.

A dielectric layer (not indicated) may reside on top of the resistive layer 6, for example to provide durability, resistance to abrasion, antiglare properties, or the like. Rows of electrodes 4 are located around the periphery of resistive layer 6. Resistive strips (not shown) can electrically connect the rows of electrodes 4 to one another. At the corners of substrate 2, each resistive strip can be connected to adjoining resistive strips, and can also be connected to an electronic controller 3 via interconnects 8. The controller 3 communicates signals to and from the resistive layer through the rows of electrodes for driving the resistive layer and for determining touch position.

Figure 4:
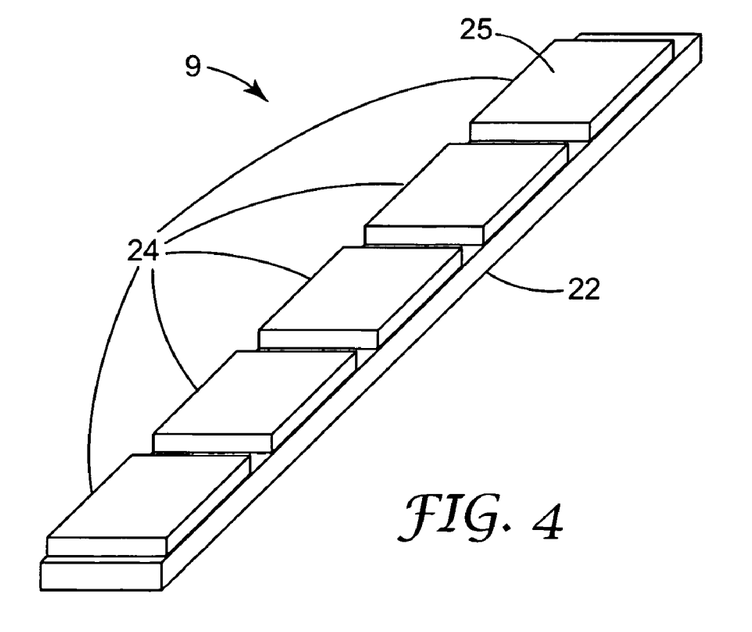
FIG. 4 is a section of a resistor and electrode strip for use as touch sensor electrodes in an embodiment of the present invention.

FIG. 4 shows a section of a resistor and electrode strip 9 for use as touch sensor electrodes in an analog touch screen of the present invention. The strip 9 includes a series of electrodes 24 disposed on a resistor strip 22. The electrodes 24 are separated so that the resistor strip 22 conducts electrical signals in the plane of the strip 9 and the electrodes 24 conduct electrical signals in the thickness direction. In use, the strip 9 can be positioned with the electrodes 24 oriented toward the resistive layer of a touch screen, as discussed in more detail below. Resistor strip 22 can be made of any suitable resistive material or composite, including carbon impregnated polymer or carbon ink. Preferably, resistor strip 22 is a self-supporting film that conducts electricity and has a higher electrical resistance than the material of the electrodes 24. Electrodes 24 can be made of any suitable conductive material or composite include Z-axis conductor (such as a Z-axis conductive adhesive), silver ink, aluminum foil, copper foil, or the like. When a Z-axis conductor is used for the electrodes, it is possible to dispose the Z-axis conductor along the entirety of the strip without breaks because the Z-axis conductor will conduct only in the thickness direction and not in the plane of the strip.

A resistive and electrode strip like strip 9 shown in FIG. 4 can be made as an assembly and applied to touch sensor substrates having resistive surfaces and optional dielectric layer(s) over the resistive surfaces. The resistor and electrode strip could be made transparent, for example employing materials such as ITO and transparent conductive polymers for the resistive and electrode components.

The resistor strip 22 and electrodes 24 can be used to deliver the signals that drive the resistive layer of the touch sensor. Preferably, voltages are uniformly delivered across an edge of the resistive layer to improve linearity of touch response. Resistor strip 22 provides a controlled resistance between adjacent electrodes 24 to help distribute driving voltages in a desirable manner. The size and shape of electrodes 24 may be varied over the length of the resistive strip 22 to achieve improved linearity of the field generated on the resistive layer of the touch sensor. Electrodes 24 may be formed into any of the known linearization patterns, for example, the pattern indicated in U.S. Pat. No. 6,549,193, incorporated by reference herein. Linearization of resistive layers on touch sensors is disclosed in U.S. Pat. Nos. 4,293,734; 4,353,552; 4,371,746; 4,622,437; 4,731,508; 4,797,514; 5,045,644; 6,549,193; and 6,593,916, each of which is incorporated into this document as if reproduced in full.

Figure 5:
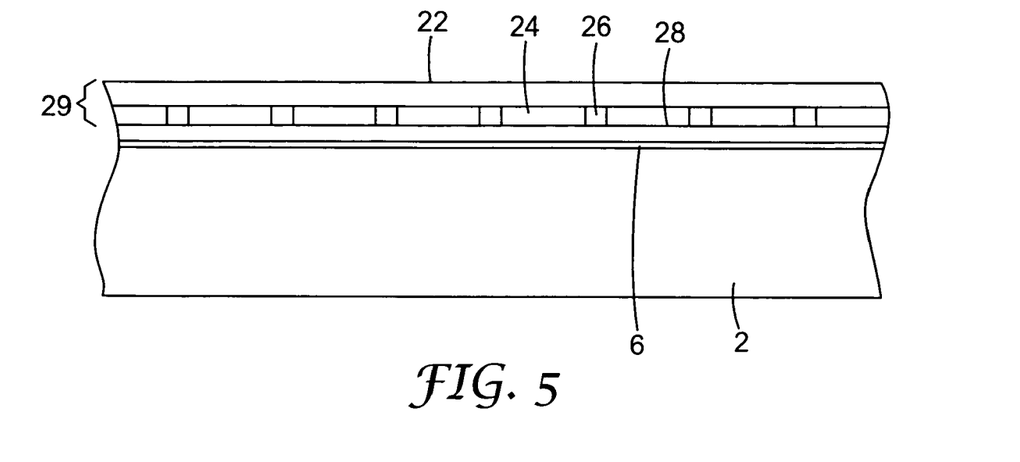
FIG. 5 is a cross section taken along line A-A of the touch sensor shown in FIG. 3.

FIG. 5 shows a cross section taken along line A-A of the touch sensor 1 shown in FIG. 3. Substrate 2 has resistive layer 6 on its top surface, and dielectric layer 28 is disposed over the resistive layer 6. A resistor and electrode strip 29 is disposed on the dielectric layer 28 so that the electrodes 24 contact the dielectric layer 28. Dielectric layer 28 typically covers the whole surface of resistive layer 6, but in some embodiments it can be patterned so that it covers only a portion of the resistive layer such as the area under electrodes 24. Electrodes 24 are electrically connected to one another through resistor strip 22, and they are capacitively coupled to resistive layer 6 through the dielectric layer 28.

Figure 6:
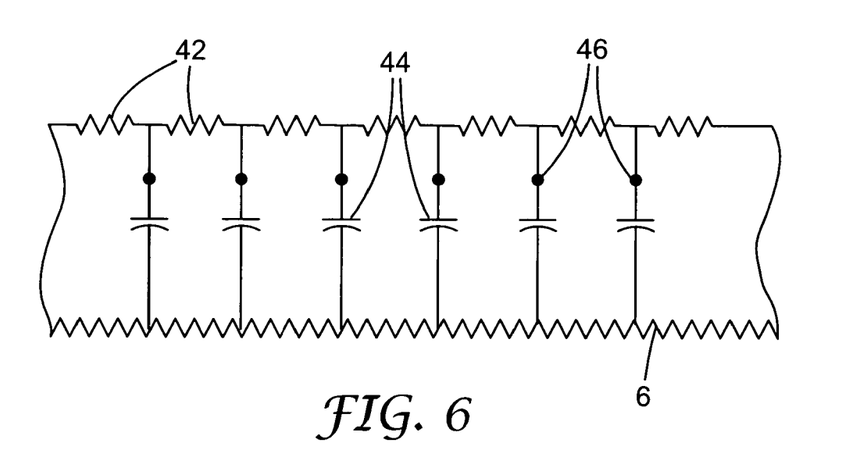
FIG. 6 is a simplified schematic drawing of the electrical relationship between the components shown in FIG. 5.

FIG. 6 shows a simplified schematic drawing of the electrical relationship between the components shown in FIG. 5. Inter-electrode resistors 42 represent the effect of resistive strip 22, which connects the electrodes 24. Electrode-resistive layer capacitors 44 represent the capacitive coupling between each electrode 24 and resistive layer 6 through dielectric layer 28. Nodes 46 on each connection between electrode-resistive layer capacitors and resistors 42 represent conductive electrodes 24.

Figure 7:
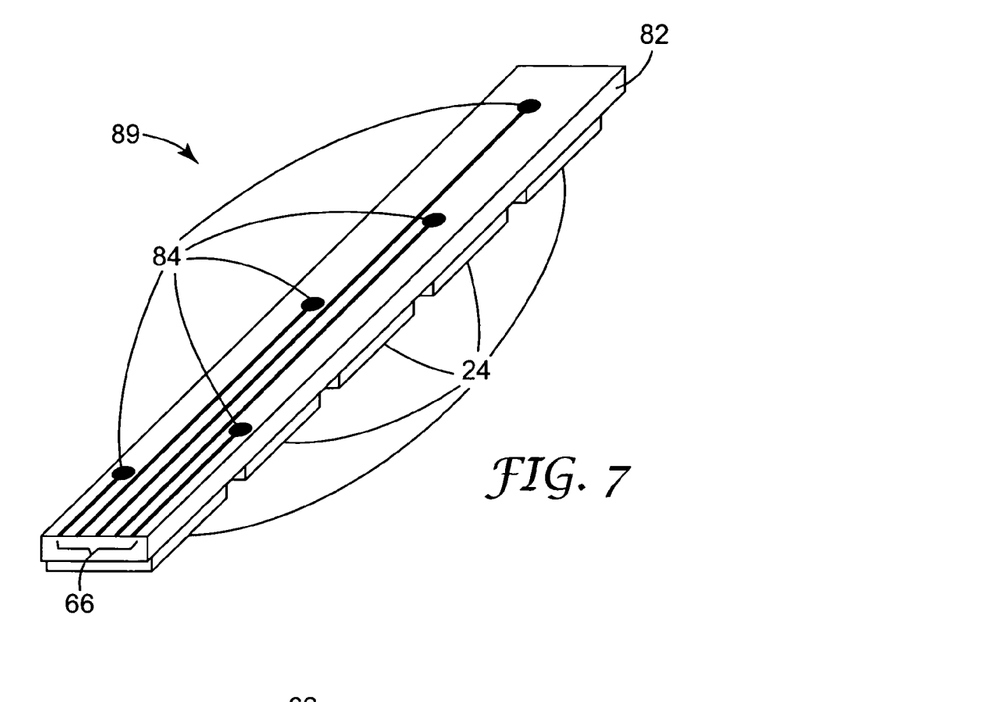
FIG. 7 is an alternative construction of an electrode strip for use with matrix touch screens according to an aspect of the present invention.

FIG. 7 shows an alternative construction of an electrode strip 89 for use with matrix touch screens. Electrodes 24 are attached to a strip 82 of dielectric substrate such as PC board or flexprint (rather than the resistive material used for the strips 9 and 29 shown in FIGS. 4 and 5). Electrical connection to each of electrodes 24 can be made through the dielectric substrate by vias 84 that connect electrodes individually to an electronic controller through interconnects 66. Interconnects 66 may be copper traces on the dielectric strip 82. Spacing of vias in dielectric strip 82 may be made to match the spacing of bars in a matrix sensor, as shown in FIG. 8.

Figure 8:
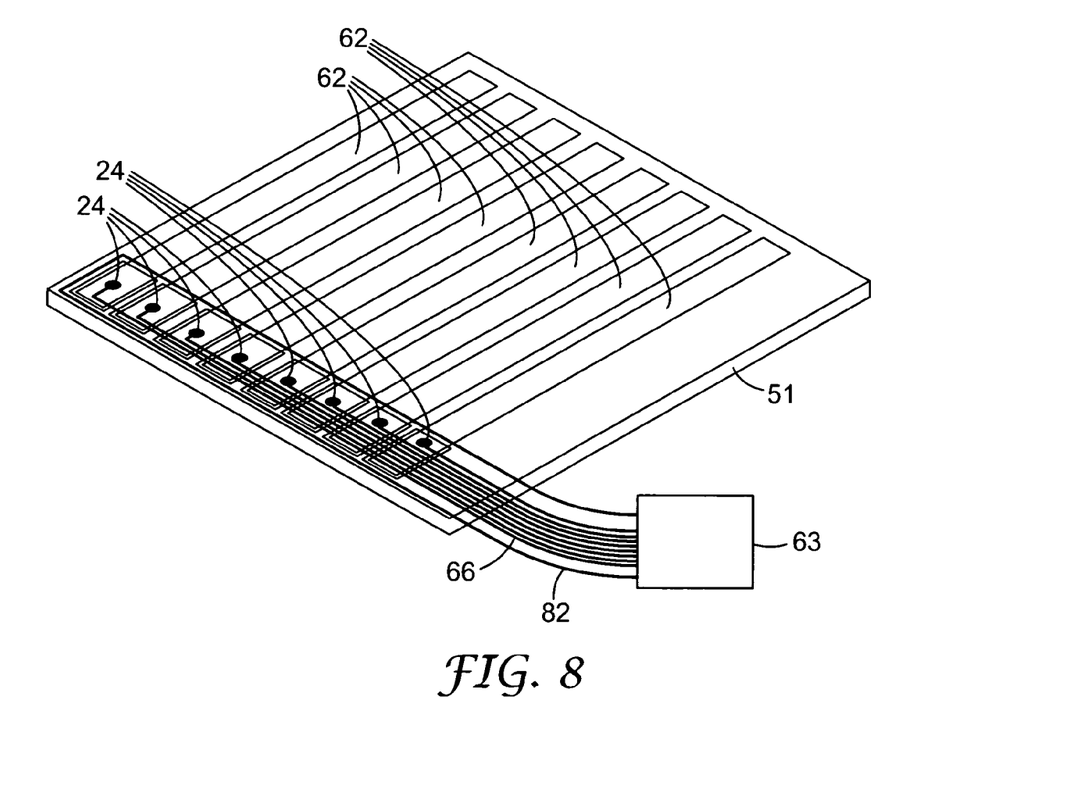
FIG. 8 shows one layer of a matrix touch panel according an embodiment of the present invention.

FIG. 8 shows one layer that may be incorporated into a matrix touch panel with eight touch-sensing resistive bars 62 on substrate 51. Electrodes 24 are shown as cross-hatched rectangles on a dielectric strip 82. Each of electrodes 24 capacitively couples to one of the resistive bars 62. Electrodes 24 connect to control electronics 63 via connection lines 66, which can be printed or otherwise patterned onto dielectric strip 82.

Figure 9:
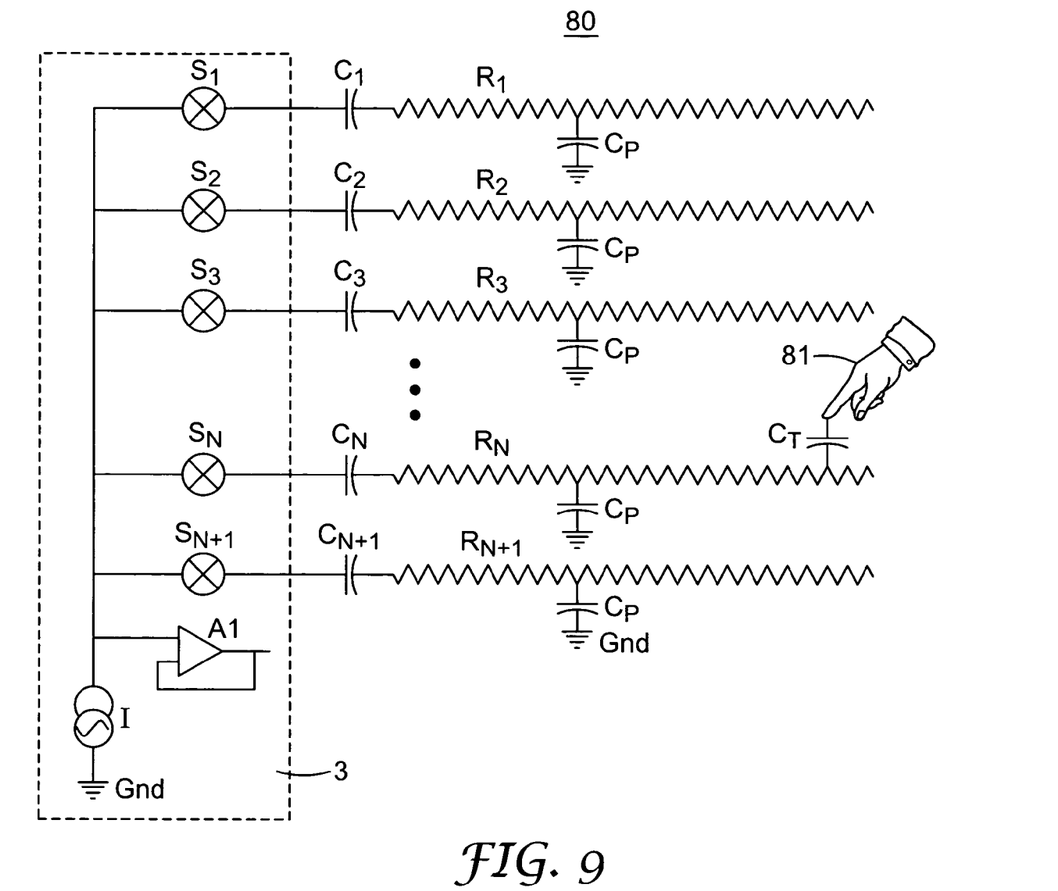
FIG. 9 is a simplified schematic drawing of the electrical relationship among the components shown in FIG. 7.

FIG. 9 shows a simplified schematic drawing of the electrical relationship among the components shown in FIG. 8. $R_1$ through $R_{N+1}$ represent the resistance of resistive bars 62. $C_P$ is the parasitic capacitance between each of the resistive bars 62 and ground. Switches $S_1$ through $S_{N+1}$ sequentially connect one of capacitors $C_1$ through $C_{N+1}$ to an AC current source labeled "I" and the input of an amplifier A1. The voltage at the input of A1 changes if the capacitance from a bar to ground is different from other bars, which is the case when touch capacitance $C_T$ is added to one or more bars. Switches $S_1$ through $S_{N+1}$ are connected to bar resistors $R_1$ through $R_{N+1}$ via capacitors $C_1$ through $C_{N+1}$, which represent the capacitive coupling between the bars and electrodes 68 (see FIG. 7). It is preferable that capacitors $C_1$ through $C_{N+1}$ have lower impedance than the parallel impedance of $C_P$ and $C_T$. In a typical case, $C_P$ is in the range of 0.5 to 10 pF and $C_T$ is in the range of 0.1 to 10 pF. Components within the dashed box are included in control electronics 63.

Performance of the capacitively coupled electrodes described herein can depend on achieving a low impedance from electrodes to the touch screen resistive touch surface. Table 1 shows capacitance (C) per unit area (1 mm$^2$) for coupling through various dielectric materials of interest in touch systems. Impedance (Z) per unit area of the capacitive connections is calculated at 100 KHz. It is desirable to have capacitive impedances that are lower than (or at least of the same order of magnitude as) the sheet resistance of the touch sensing resistive layer. In addition, electrode capacitive coupling impedance is preferably lower than the capacitive impedance for touch events, typically about 100 to 2000 pF for analog capacitive touch screens and 0.1 to 10 pF for matrix touch screens of typical construction.

TABLE 1

| dielectric thickness (mm) | dielectric constant ($e_r$) | C | $Z/mm^2$ at 100 KHz | simulated dielectric |
|---|---|---|---|---|
| 0.00012 | 3 | $2.21 \times 10^{-10}$ | $7.2 \times 10^3$ | polymer in anti-reflective stack |
| 0.001 | 4.5 | $3.98 \times 10^{-11}$ | $4.0 \times 10^4$ | silicon dioxide protective layer |
| 0.0001 | 4.5 | $3.98 \times 10^{-10}$ | $4.0 \times 10^3$ | silicon dioxide quarter wave |
| 0.0066 | 3 | $4.02 \times 10^{-12}$ | $4.0 \times 10^5$ | hardcoat on polyester film |
| 0.127 | 4.5 | $2.09 \times 10^{-13}$ | $7.6 \times 10^6$ | polyester film |
| 3.18 | 4.5 | $1.22 \times 10^{-14}$ | $1.3 \times 10^8$ | glass |

Figure 10:
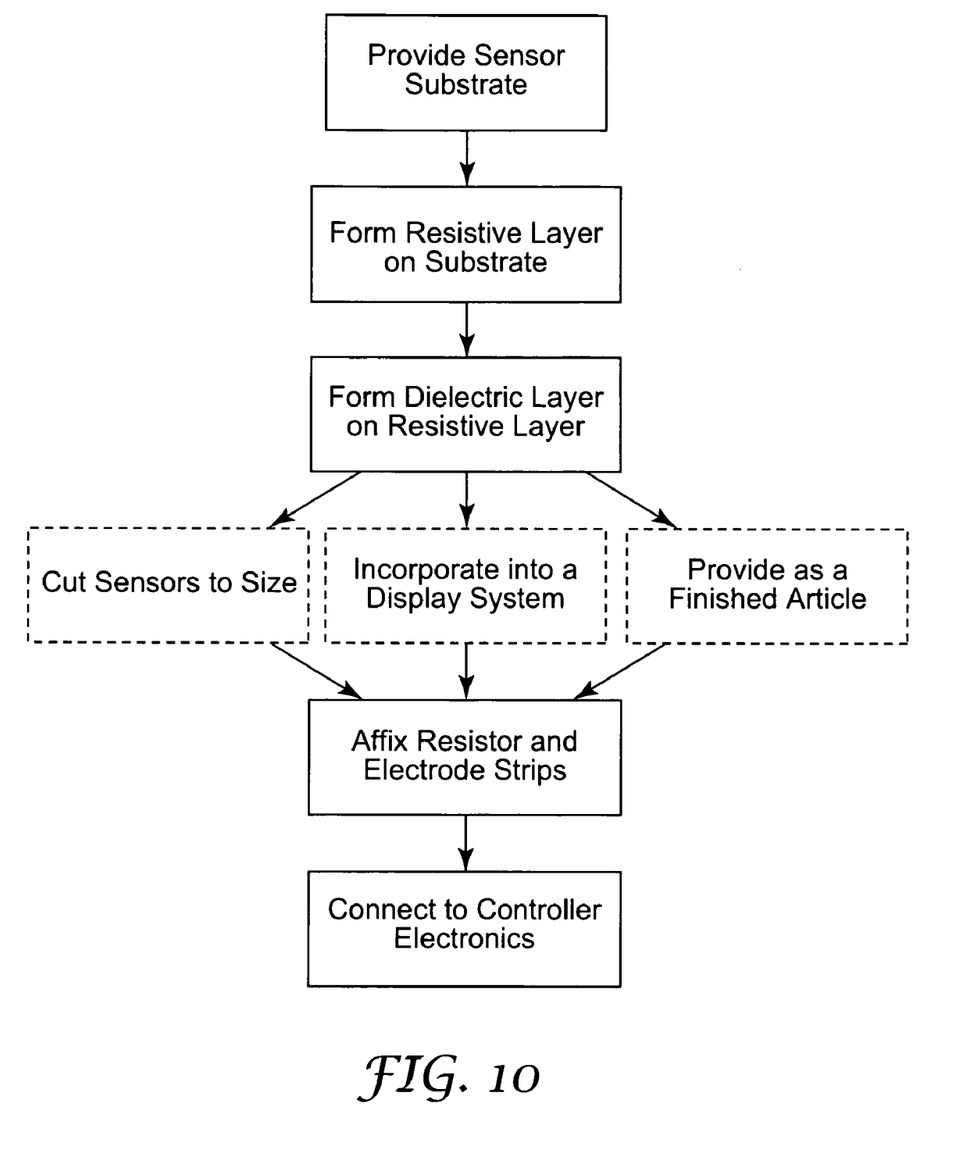
FIG. 10 is a flow chart indicating steps that can be performed in some methods of the present invention.

FIG. 10 shows a flow chart indicating steps that can be performed in some methods of the present invention. For example, a sensor substrate can be provided. The substrate can be glass, plastic, or any other suitable sensor substrate. In addition, the substrate can be a functioning device such as an electronic display, privacy filter, polarizer, and so forth. A resistive layer can be formed (or otherwise provided) on the substrate. The resistive layer preferably has electrical properties such as sheet resistance and uniformity that are conducive to be used to sense a touch in a touch sensor. The resistive layer may be patterned at the time of forming, for example by a masking process; or by modifying after forming, for example by removing resistive material by chemical etching or laser ablation. Optionally, the resistive layer can perform other functions. For example, the resistive layer can be one of the layers in an antireflection stack that is formed on a substrate. A dielectric layer can then be formed on the resistive layer. The dielectric layer can cover the entire resistive layer, or can be patterned to cover certain portions of the resistive layer such as the periphery. At this stage (or elsewhere in the process, as appropriate), a number of optional steps can be performed. For example, the resistive layer and dielectric layer may have been formed on a substrate that is larger than the intended size of the touch sensors either in a multiple up configuration or on a flexible substrate in a roll-to-roll manufacturing process. As such, the sensors can be cut to intended size. In addition or alternatively, the sensor substrate can be incorporated into a display device prior to affixing the capacitively coupled electrodes. In addition or alternatively, the sensor substrate can be fashioned into a finished article such as an antireflection plate, a light control film, an antistatic plate, or the like prior to affixing the capacitively coupled electrodes. The resistor and electrode strips can then be affixed to the sensor so that the electrodes are capacitively coupled to the resistive layer as described herein. Controller electronics can also then be electrically coupled to the resistive layer through the resistor and electrode strips.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A touch sensor comprising:
   a resistive layer configured for sensing a touch to the touch sensor;
   a layer of continuous resistor material;
   a plurality of more than four electrodes, each of the plurality of electrodes electrically connected to the layer of continuous resistor material along a length of the resistor material; and
   a dielectric layer disposed between the plurality of electrodes and the resistive layer,
   wherein each of the plurality of electrodes is capacitively coupled to the resistive layer through the dielectric layer to form a respective one of a plurality of capacitors, and
   wherein the plurality of electrodes are positioned to provide a uniformly distributed driving signal to the resistive layer.

2. The touch sensor of claim 1, wherein the dielectric layer is disposed between the plurality of electrodes electrically connected to the layer of continuous resistor material and the resistive layer.

3. The touch sensor of claim 2, wherein the resistive layer has a top surface, and wherein the dielectric layer is disposed over and in electrical communication with the entire top surface of the resistive layer.

4. The touch sensor of claim 2, wherein the resistive layer has a top surface, and wherein the dielectric layer is disposed over and in electrical communication with only a portion of the top surface of the resistive layer.

5. A method for making a touch sensor comprising:
   providing an article including a resistive layer suitable for sensing a touch;
   providing a layer of continuous resistor material;
   providing a plurality of more than four electrodes, each of the plurality of electrodes mutually electrically connected to the layer of continuous resistor material along a length of the resistor material;
   providing a dielectric layer that capacitively couples each of the plurality of electrodes to the resistive layer to form a respective one of a plurality of capacitors, wherein the plurality of electrodes are positioned to provide a uniformly distributed driving signal to the resistive layer; and
   electrically coupling the plurality of electrodes and the layer of continuous resistor material to controller electronics configured to communicate signals to and from the resistive layer through the plurality of electrodes and the layer of continuous resistor material.

6. A touch sensor comprising:
   a plurality of electrically isolated resistive elements configured for sensing a touch to the touch sensor;
   an electrode strip comprising a plurality of more than four electrodes along a length of the electrode strip, the plurality of electrodes individually electrically connected to controller electronics; and
   a dielectric layer,
   wherein the electrode strip is disposed such that each of the plurality of electrodes is capacitively coupled to one of the resistive elements through the dielectric layer to form a respective one of the plurality of capacitors.

* * * * *